US008726595B2

(12) United States Patent
Riccobene

(10) Patent No.: US 8,726,595 B2
(45) Date of Patent: May 20, 2014

(54) IRREGULAR BUILDING UNITS HAVING MATING SIDES

(71) Applicant: Thomas S. Riccobene, Albuquerque, NM (US)

(72) Inventor: Thomas S. Riccobene, Albuquerque, NM (US)

(73) Assignee: Keystone Retaining Wall Systems LLC, Minneapolis, MN (US)

( * ) Notice: Subject to any disclaimer, the term of this patent is extended or adjusted under 35 U.S.C. 154(b) by 0 days.

(21) Appl. No.: 13/722,349

(22) Filed: Dec. 20, 2012

(65) Prior Publication Data
US 2013/0111844 A1    May 9, 2013

Related U.S. Application Data

(62) Division of application No. 12/908,074, filed on Oct. 20, 2010, now Pat. No. 8,336,274.

(51) Int. Cl.
*E04F 15/08*    (2006.01)
*E01C 5/04*    (2006.01)

(52) U.S. Cl.
CPC .............. *E01C 5/04* (2013.01); *E01C 2201/12* (2013.01); *E04F 15/08* (2013.01); *E04F 2203/02* (2013.01)
USPC .......... 52/311.2; 52/604; 52/589.1; 52/302.4; 404/41

(58) Field of Classification Search
CPC ......... E01C 5/00; E01C 5/04; E01C 2201/12; E01C 2201/02; E04F 15/02; E04F 15/08; E04F 2203/02
USPC ............... 52/79.4, 747.12, 311.1, 311.2, 596, 52/604, 605, 608, 589.1, 302.4; 404/34, 404/41, 42; 47/33; D25/113
See application file for complete search history.

(56) References Cited

U.S. PATENT DOCUMENTS

| | | | |
|---|---|---|---|
| 2,662,343 A * | 12/1953 | Rice | .................................. 47/33 |
| 3,267,823 A | 8/1966 | MacRae | |
| D231,926 S | 6/1974 | Appleton | |
| 3,903,702 A * | 9/1975 | Appleton | ........................ 405/20 |
| 3,947,192 A | 3/1976 | Rosenberger | |
| 4,125,341 A | 11/1978 | Reinschutz | |
| 4,217,740 A | 8/1980 | Assanti | |
| 4,354,773 A | 10/1982 | Noack | |

(Continued)

FOREIGN PATENT DOCUMENTS

EP    666372    8/1995

OTHER PUBLICATIONS

Machine Translation of EP0666372A1, generated Dec. 2013.*

(Continued)

*Primary Examiner* — Brent W Herring
(74) *Attorney, Agent, or Firm* — Greer, Burns & Crain, Ltd.

(57) ABSTRACT

An irregularly-shaped building unit includes a front surface, a rear surface opposite of the front surface, and an outer contour surface that extends generally perpendicularly from the front surface to the rear surface. The outer contour surface is irregularly shaped. A plurality of mating sides are disposed on the outer contour surface, where at least two mating sides intersect with a major axis, and at least two mating sides intersect with a minor axis. The major axis and the minor axis are generally perpendicular to each other. Each mating side is a centered rotation about the respective axis that the mating side intersects with.

19 Claims, 5 Drawing Sheets

(56) References Cited

U.S. PATENT DOCUMENTS

| | | | |
|---|---|---|---|
| 4,627,764 A * | 12/1986 | Scheiwiller | 404/41 |
| D287,884 S | 1/1987 | Scheiwiller | |
| 4,761,095 A * | 8/1988 | Bartlechner | 404/41 |
| 4,773,790 A | 9/1988 | Hagenah | |
| 4,792,257 A * | 12/1988 | Rinninger | 404/41 |
| 4,834,575 A * | 5/1989 | Barth et al. | 404/39 |
| 4,997,308 A * | 3/1991 | Welling, Jr. | 404/38 |
| 5,201,843 A * | 4/1993 | Hair | 404/41 |
| 5,244,303 A * | 9/1993 | Hair | 404/41 |
| 5,348,417 A | 9/1994 | Scheiwiller | |
| 5,449,245 A * | 9/1995 | Glickman | 404/38 |
| 5,588,775 A | 12/1996 | Hagenah | |
| 5,625,990 A | 5/1997 | Hazlett | |
| 5,645,369 A * | 7/1997 | Geiger | 404/34 |
| 5,797,698 A * | 8/1998 | Barth et al. | 404/39 |
| 5,884,445 A | 3/1999 | Woolford | |
| 5,887,846 A | 3/1999 | Hupp | |
| 5,902,069 A | 5/1999 | Barth et al. | |
| 5,921,705 A | 7/1999 | Hodson et al. | |
| 5,945,181 A | 8/1999 | Fisher | |
| 6,151,854 A * | 11/2000 | Gutjahr | 52/385 |
| 6,536,988 B2 | 3/2003 | Geiger | |
| D480,819 S | 10/2003 | Barbier | |
| D488,566 S | 4/2004 | Fleishman | |
| 6,881,463 B2 | 4/2005 | Riccobene | |
| 7,393,155 B2 | 7/2008 | Riccobene | |
| 7,637,688 B2 | 12/2009 | Riccobene | |
| 7,950,873 B2 * | 5/2011 | Geiger | 404/39 |
| 7,988,382 B2 | 8/2011 | Castonguay et al. | |
| 8,226,323 B2 | 7/2012 | Bouchard et al. | |
| 8,336,274 B2 | 12/2012 | Riccobene | |
| 8,500,362 B2 * | 8/2013 | Steffen | 404/36 |
| 2003/0007834 A1 | 1/2003 | Bolduc et al. | |
| 2007/0217865 A1 | 9/2007 | Castonguay et al. | |
| 2008/0267703 A1 | 10/2008 | Adam | |
| 2009/0155497 A1 * | 6/2009 | Castonguay et al. | 428/15 |
| 2009/0297267 A1 | 12/2009 | Glynn | |
| 2010/0236174 A1 | 9/2010 | Castonguay et al. | |
| 2012/0171465 A1 * | 7/2012 | Hopperus-Buma | 428/317.7 |

OTHER PUBLICATIONS

Jinny Beyer, The Secrets of Interlocking Patterns, 1999, pp. 2-17, 125-165.

http://www.ephenry.com/permeable-pavers.aspx, Permeable Pavers, printed on Dec. 27, 2012, pp. 1-2.

http://garages.about.com/od/buildingagarage/a/Pernneable-Paving-Options-For-Residential-Driveways.htm, Permeable Paving Options for Residential Driveways, printed on Dec. 27, 2012, pp. 1-2.

http://www.concretenetwork.com/concrete/porous_concrete_pavers/, Permeable and Porous Concrete Pavers, printed on Dec. 27, 2012, pp. 1-2.

* cited by examiner

IRREGULAR BUILDING UNITS HAVING MATING SIDES

CROSS-REFERENCE

This application is a divisional application of co-pending application Ser. No. 12/908,074 filed Oct. 20, 2010.

FIELD OF THE INVENTION

This disclosure relates to repeating building units forming a surface covering and/or structure, and more specifically relates to stones, bricks, pavers and tiles for forming surface coverings, walls or other structures.

BACKGROUND

It is well known to cover surfaces, such as walkways, driveways, patios, floors, work surfaces, walls and other interior or exterior surfaces with stones, bricks, pavers, tiles and other architectural surface covering units. It is further known to construct walls and other structures with stone and bricks. Natural stone surface coverings and structures are constructed by cutting and fitting irregularly sized and shaped stones. The work requires a skilled stonemason to select, cut and fit the stone. It is labor intensive, and accordingly expensive. Custom built natural stone surfaces and structures, however, are very attractive and desirable.

Conventional surface coverings and structures are also constructed of manufactured pavers, bricks, tiles or other units. Manufactured units are typically provided in geometric shapes, such as squares, rectangles and hexagons, or combinations thereof. Surfaces covered with manufactured units typically are laid in repeating patterns. Alternatively, it is known to lay conventional units in random, non-repeating patterns. Random patterns are regarded as esthetically pleasing and are becoming more popular. However, random patterns of manufactured units do not have the degree of natural irregularity that is desirable in custom stone walkways, driveways, patios, walls and the like.

SUMMARY

According to the present invention there is provided irregular building units. As used herein, the term "building units" or "units" refers to bricks, blocks, stones, tiles or other two or three dimensional objects that can be used in the construction of floors, walls, retaining walls, columns or other structures, including interior and exterior structures, and including load bearing and non-load bearing structures. The outer contour surface of the building unit includes "mating sides" that are configured to mate with mating sides of adjacent units. The outer contour surface further includes "corners", which refers to the portions of the outer contours that are not configured to mate with adjacent building units. It should be appreciated that the "corners" can be any shape, and that the corners are not limited to an angular point of converging lines, but instead can be generally rounded and are preferably irregularly shaped.

The term "gaps" means holes or spaces between adjacent building units in the covered surface, such as gaps between corners of adjacent building units. The term, "without substantial gaps" means no gaps and/or comparatively small gaps that may be filled with sand or mortar, such as between the mating sides.

In accordance with the invention, preferably both the mating sides and the corners of the outer contour surface of the building unit are irregularly shaped. By the term "irregularly shaped" it is meant that the side appears jagged or rough hewn or comprises complex curves, and is not a straight line or a simple curve, e.g., a circular arc. However, it should be understood that an irregularly shaped side might comprise a multiplicity of straight-line segments angled with respect to each other, such that the general appearance of the side is irregular. Optionally, one or more sides could consist of or include a straight segment or a regular geometric curve.

One application of the building unit is a surface covering. The term "surface covering" is used in its broadest meaning, and includes architectural and product surfaces, interior and exterior surfaces, and floors, walls and ceilings. The surface covering comprises a multiplicity of building units assembled to form a surface without overlap between units. An example of a surface covering using the building unit is a "stepping stone" covering. The building unit can further be used to form a permeable surface covering. The term "permeable surface covering" is used in its broadest meaning, and includes a surface covering that allows drainage through the surface covering, such as drainage through open voids or gaps between mating building units. Example uses of permeable surface coverings are parking lots, driving surfaces, pedestrian surfaces, among other uses. Permeable fillers and plantings may be located in the open voids or gaps.

Further applications of the building unit are "vertical and three dimensional structures" which are a type of "surface covering". The term "vertical and three dimensional structures" is used in its broadest meaning, and includes structures such as walls, columns, containers and other structures.

In accordance with the present invention, an irregularly-shaped building unit is provided. The building unit includes a front surface, a rear surface opposite of the front surface, and an outer contour surface that extends generally perpendicularly from the front surface to the rear surface. The outer contour surface is irregularly shaped. A plurality of mating sides are disposed on the outer contour surface, where at least two mating sides intersect with a major axis, and at least two mating sides intersect with a minor axis. The major axis and the minor axis are generally perpendicular to each other. Each mating side is a centered rotation about the respective axis that the mating side intersects with.

An alternate building unit includes a front surface and an outer contour surface that extends generally perpendicularly from the front surface. The outer contour surface is irregularly shaped. A first mating side is disposed on the outer contour surface. The first mating side is bisected by a major axis into a first segment and a second segment, where the first segment is a rotational image of the second segment. The first segment is rotated from the second segment about the major axis by an angle of about 180-degrees. A second mating side is disposed on the outer contour surface. The second mating side is bisected by a minor axis into a first segment and a second segment, where the first segment is a rotational image of the second segment, rotated from each other about the minor axis by an angle of about 180-degrees. The major and minor axes intersect with each other. A corner is disposed on the outer contour surface between the first mating side and the second mating side.

A surface covering is also provided. The surface covering includes a plurality of building units having a plurality of mating sides. The mating sides are disposed on an outer contour surface. At least one mating side of the building units intersects with a major axis, and at least one mating side of the building units intersects with a minor axis. The major axis and the minor axis are generally perpendicular, and each of the mating sides is a centered rotation about the respective axis that the mating side intersects with. A first of the plurality of building units has a first mating side that mates with a second mating side of a second of the plurality of building units.

DETAILED DESCRIPTION

Figure 1:
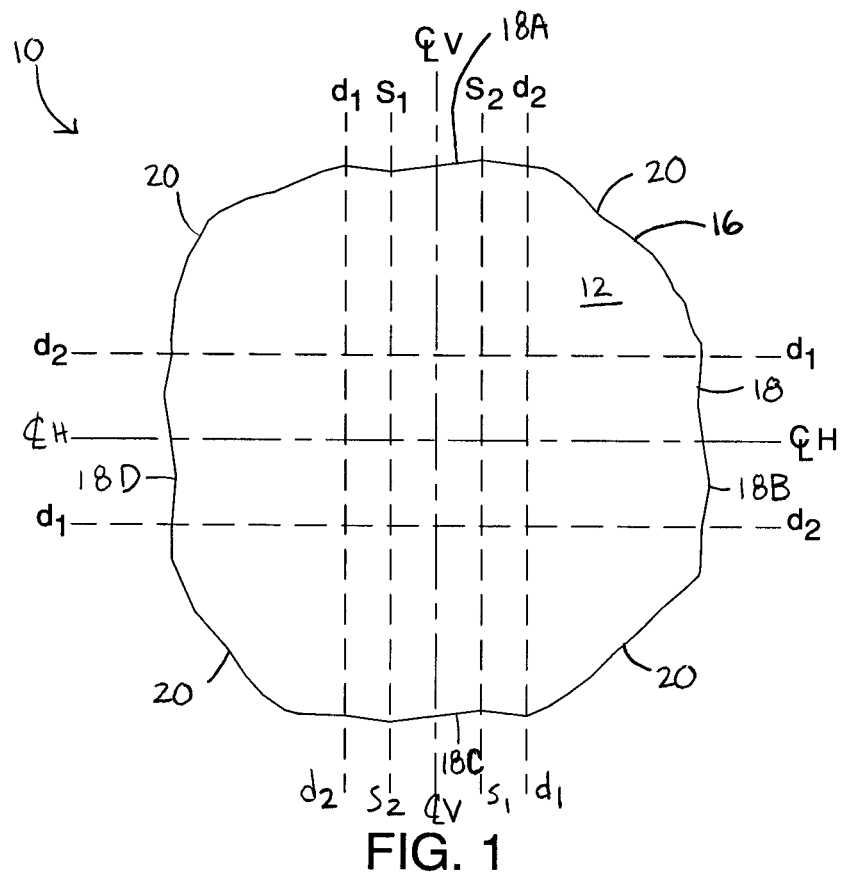
FIG. 1 is a plan view of a first embodiment of building unit.

Preferred embodiments of the present invention are described below by way of example only, with reference to the accompanying drawings.

Referring to FIGS. 1-9, a building unit 10 has a generally planar configuration that includes a front surface 12, a rear surface 14 opposite of the front surface, and an outer contour surface 16 extending substantially perpendicularly from the front surface and the rear surface. The front surface 12 preferably has a stone texture or other surface textures to facilitate a natural appearance. Further, the front surface 12 can include false joints.

The building units 10 can have differing shapes and dimensions. Referring to the building unit 10 of FIG. 1, the thickness of the building unit (in the direction into the page) can vary. The building unit 10 can be a thin unit, such as a tile, can have an increased thickness, such as for use as a stepping stone or parking/driving surface, or can have a large thickness, such as an extruded column. Any length, width and thickness of the building unit 10 is contemplated for varying uses, including both structural and non-structural uses.

The outer contour surface 16 of the building unit 10 includes a plurality of mating sides 18 extending between endpoints 22 at distance dl and 24 at distance d2 and centered on centerlines CLV and CLH. The mating sides 18 are configured to mate with mating sides of adjacent building units 10. The outer contour surface 16 further includes corners 20 that are not configured to mate with adjacent building units 10. It should be appreciated that the corners 20 can be any shape, and that the corners are not limited to an angular point of converging lines, but instead can be generally rounded, irregularly-shaped, or even a substantially straight line. Each of the corners 20 could be of the same configuration, but preferably each corner has a different configuration from the other corners. The corners 20 extend around the outer contour surface 16 alternating with mating sides 18 and extending between endpoint 22 at d1 and endpoint 24 at d2.

The building unit 10 preferably has four mating sides 18: a first mating side 18A, a second mating side 18B, a third mating side 18C, and a fourth mating side 18D. While the building unit 10 will be discussed with respect to an outer contour surface 16 that has four mating sides 18, it is possible that the building unit 10 can have differing numbers of mating sides 18.

The building unit 10 has at least two axes, a major axis CLV and a minor axis CLH that intersect and are preferably generally perpendicular to each other. The major axis CLV is longer than the minor axis CLH, however the axes can be the same length, or the axes can have differing lengths. As seen in FIG. 1, the major axis CLV intersects with and is generally perpendicular to the first mating side 18A and to the third mating side 18C, and the minor axis CLH intersects with and is generally perpendicular to the second mating side 18B and to the fourth mating side 18D. Each mating side 18 has two end points 22, 24 that define a line 26 between the two end points. The center of each line 26 is generally perpendicular to the major axis CLV and to the minor axis CLH, depending on which of the axes the particular line intersects with.

Figure 2:
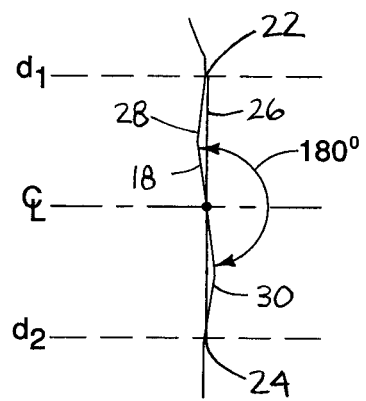
FIG. 2 is a schematic diagram of a mating side of the building unit showing the rotational relationship of segments of the mating side about a centerline.

The four mating sides 18 are translated images of one another. By the term "translated image" it is meant that the mating sides 18 are substantially identical copies of each other, each having substantially the same length and configuration, but the mating sides are located at four different locations around the outer contour surface 16. Referring to FIG. 2, the four mating sides 18 are also center rotational images. By the term "center rotational image" it is meant that a first segment 28 extending from the centerline CL to the endpoint 22 would be identical to a second segment 30 extending from the centerline CL to the endpoint 24 if the segment 28 was rotated 180-degrees about the centerline CL. The centerlines CLV, CLH are midpoints that bisect the mating side 18 into the two segments 28, 30, thus the centerlines are the "center" of the rotation. With this configuration of building unit 10, all mating sides 18 of one building unit will mate with any mating side 18 of another building unit (see FIG. 5).

Figure 3:
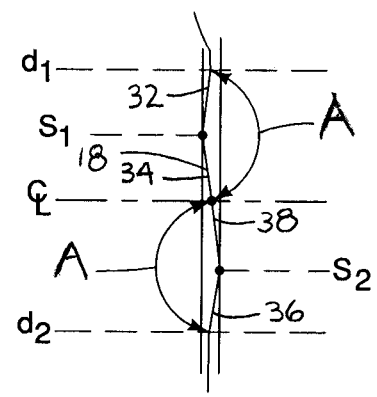
FIG. 3 is a schematic diagram of the mating side of the building unit showing the angular relationship between segments of the mating side about a sub-centerline.

The first segment 28 of the building panel 10 includes sub-segment 32 and sub-segment 34. In the building panel 10, the sub-segment 32 and the sub-segment 34 are two substantially straight lines having substantially the same lengths, extending from s1 to d1, and extending from s1 to CL, respectively. Similarly, the second segment 30 includes sub-segment 36 and sub-segment 38. In the building panel 10, the sub-segment 36 and the sub-segment 38 are also two substantially straight lines having substantially the same lengths, extending from s2 to d2, and extending from s2 to CL, respectively. The radial angle A between the sub-segments 32 and 34 about the center s1, and the radial angle between the sub-segments 36 and 38 about the center s2 are both about 166-degrees, however other angles are possible. In the embodiment of FIG. 3, the radial angle A is 165.75-degrees.

Figure 8:
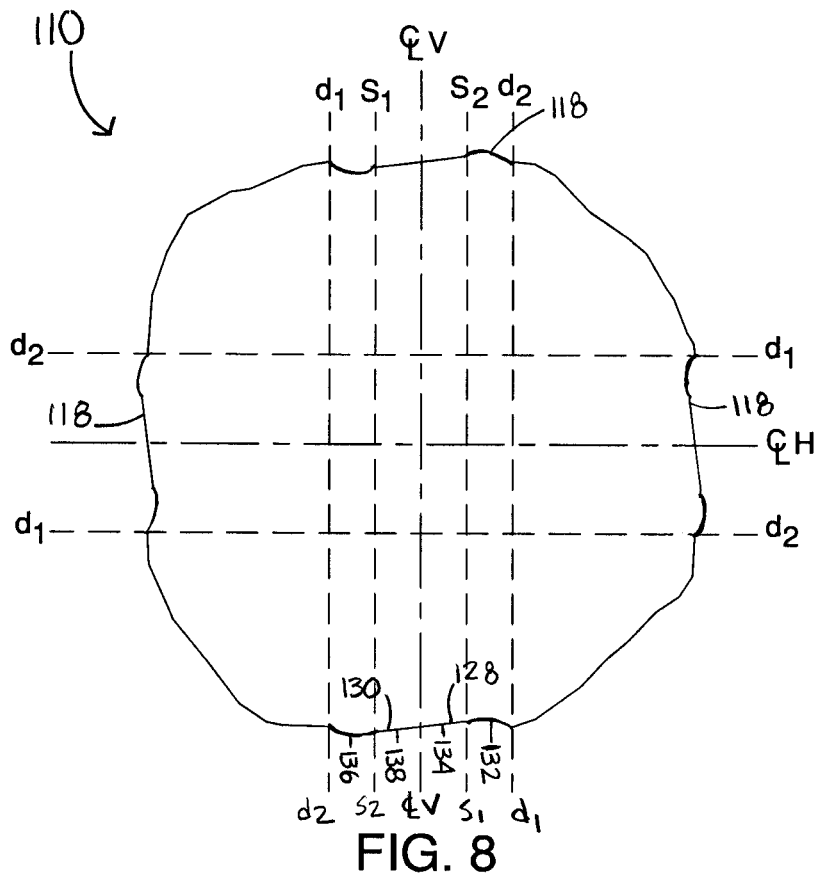
FIG. 8 is a plan view of a second embodiment of building unit.
Figure 9:
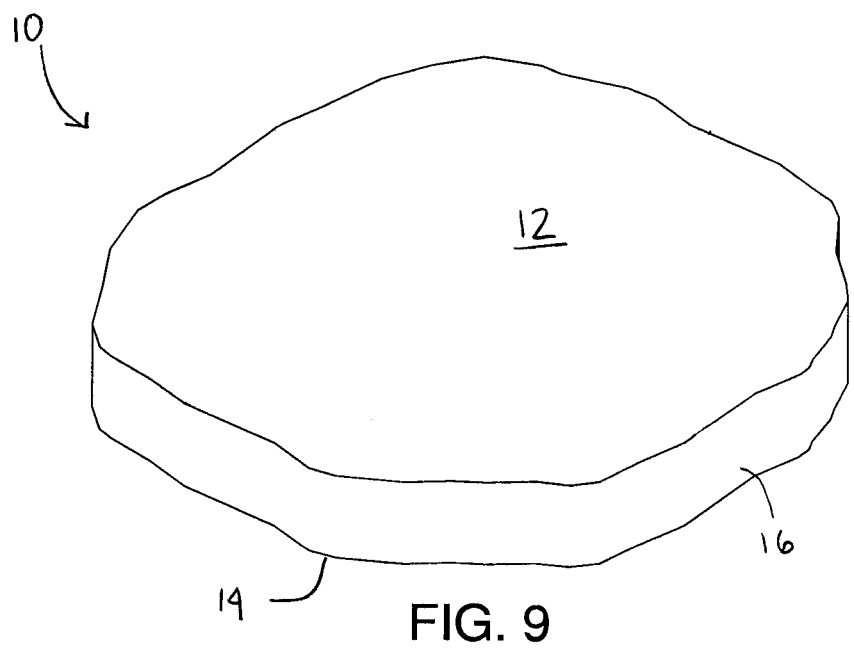
FIG. 9 is a perspective view of the first embodiment of building unit.

Referring to a second embodiment of building unit 110 in FIG. 8, it should be understood that the mating sides 118 can include substantially straight segments, curved segments including an irregular spline, and any combination thereof. The mating sides may have an "S"-curve shape. In the building unit 110 of FIG. 8, the sub-segments include substantially straight sub-segments 134, 138 and curved sub-segments 132, 136. It should further be appreciated that the sub-segments 132 and 134 of segment 128, or sub-segments 136 and 138 of segment 130 may be equal in length or differing in length. As a result, the lines sub-dividing the segments s1, s2 may be closer to or further away from the centerline CL. Additionally, it is possible that each segment 128, 130 may include one or more sub-segments.

Figure 5:
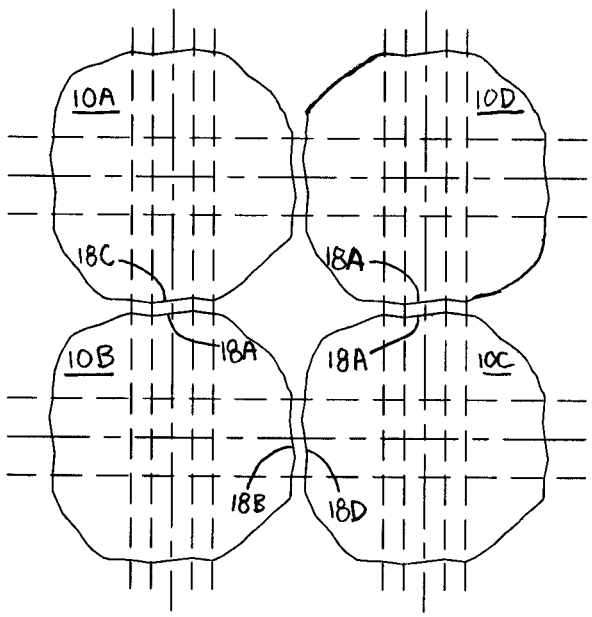
FIG. 5 is a plan view of four building units showing the relationships of the mating sides of the building units.

An example relationship of the four mating sides 18 is shown in FIG. 5. Each mating side 18 of the building unit 10 is configured such that any mating side of one building unit can mate with any mating side of a second building unit. In this example, the mating side 18C of building unit 10A is configured to engage the mating side 18A of building unit 10B. The mating side 18B of building unit 10B is configured to engage the mating side 18D of building unit 10C. The mating side 18A of building unit 10C is configured to engage the mating side 18A of building unit 10D, where building unit 10D is rotated 180-degrees relative to building units 10A, 10B and 10C.

The shape of the corners 20 between mating sides 18 can vary from corner to corner of a single building unit 10, and the shape of the corners can vary among multiple building units 10. Since the corners 20 of adjacent building units 10 do not mate, the shape of the corner is immaterial as to how the multiple building units lay-out relative to each other. However, the shape of the corner 20 is material to the building unit 10 having a natural appearance. For this reason, it is preferred that the corner 20 be irregularly shaped.

Applications of the building units 10 include surface coverings, including vertical and three dimensional structures. The surface coverings can be of different sizes and shapes, and can be constructed with different numbers and arrangements of building units 10. Because all of the building units 10 include substantially identical mating sides 18, the building units readily mate with each other. As a result of the irregular side configurations of the outer contour surface 16, one can construct a surface covering or structure that has a natural appearance. The surface covering or structure has the appearance of being custom built. One example surface covering using the building units 10 is a stepping stone covering. The building units 10 are well suited to form a permeable surface covering in that gaps 42 formed between the corners 20 of adjacent building units can allow drainage.

Figure 6:
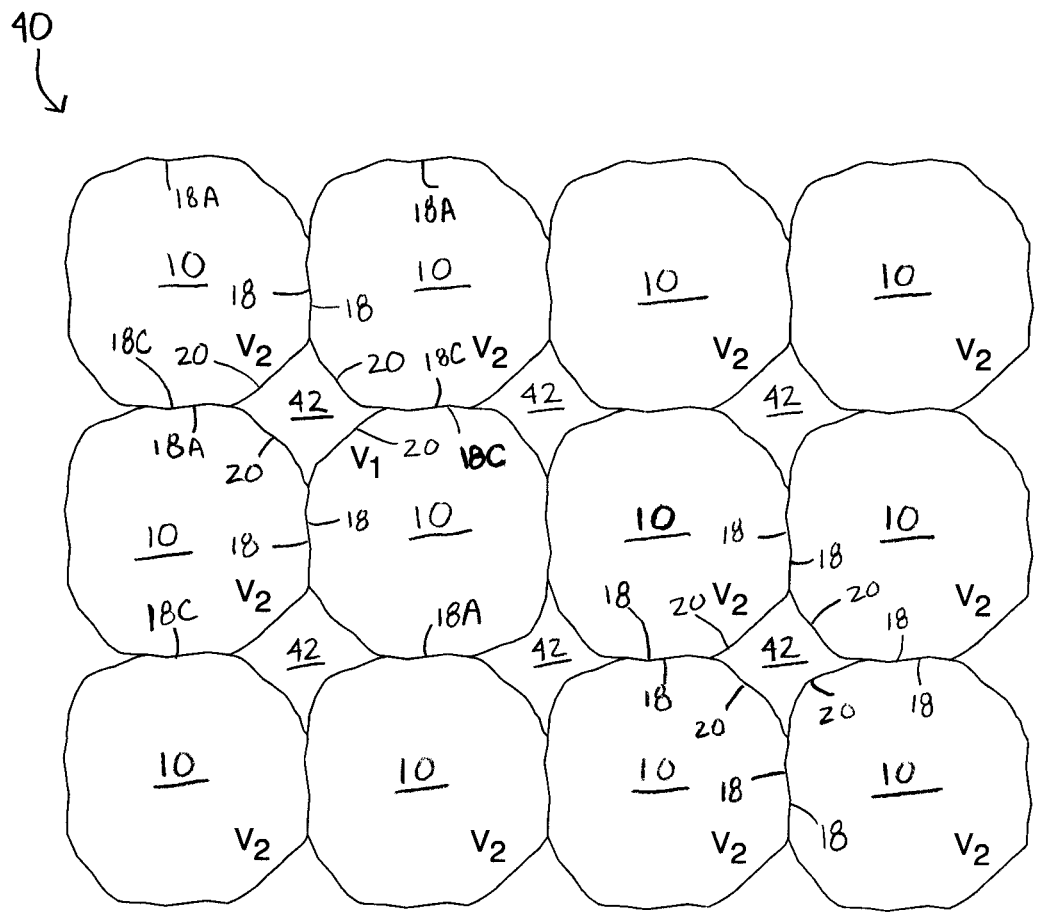
FIG. 6 is a plan view of the building units in a first embodiment of surface covering.
Figure 7:
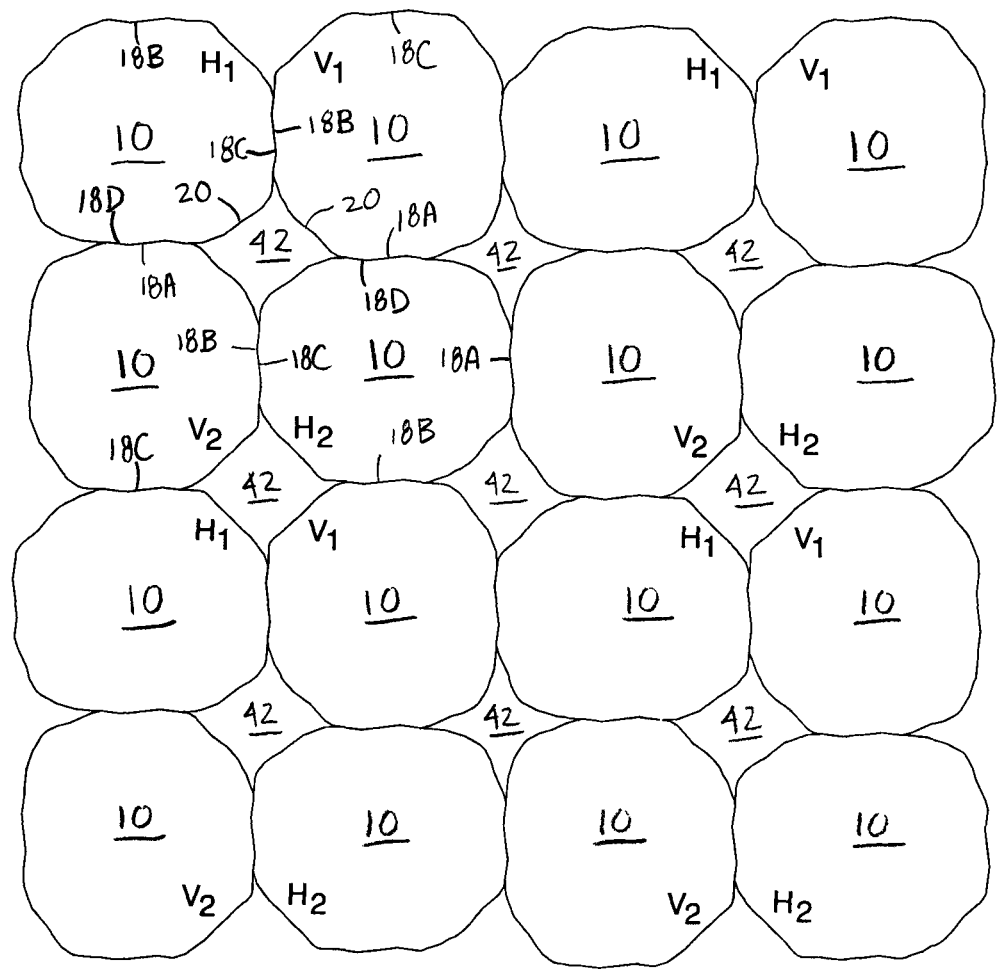
FIG. 7 is a plan view of the building units in a second embodiment of surface covering.

Referring now to FIG. 6 and FIG. 7, the drawings show two embodiments of surface covering 40 and 44. It should be appreciated that the surface coverings 40, 44 can be on a horizontal plane, a vertical plane or have any other orientation. Further, the surface covering 40, 44 may form a non-planar surface.

FIG. 6 shows a surface covering 40 constructed in accordance with a first embodiment of the present invention. The surface cover 40 includes an arrangement of building units 10 with no overlapping between the adjacent building units and with gaps 42 between corners 20 of the building units. Grass, sand, gravel, concrete, glass, grout, plantings, or other fillers may be used to fill in the gaps 42. The mating sides 18 of adjacent building units 10 should mate without substantial gaps. In FIG. 6, the surface covering 40 has a plurality of a single embodiment of building unit 10 that is arranged in two different positions V1 and V2, where the building units are rotated 180-degrees in positions V1 and V2. The two different positions V1 and V2 refer to the two positions of the mating sides 18A and 18C that lay on the axis CLV of the building unit 10 (see FIG. 1). Referring to the building unit 10 that is in position V1, the mating sides 18A and 18C are oriented 180-degrees as compared to the sides 18A and 18C on the building units 10 that are in position V2. Alternately, the surface cover 40 can have a plurality of building units 10 arranged in a single position (shown on the right-half of FIG. 6, where all building units are in position V2).

FIG. 7 shows a surface covering 44 constructed in accordance with a second embodiment of the present invention. The surface covering 44 includes an arrangement of building units 10 with no overlapping between the adjacent building units and with gaps 42 between corners 20 of the building units. As in the surface covering 40, the mating sides 18 of adjacent building units 10 should mate without substantial gaps. In FIG. 7, the surface covering 44 has a plurality of a single embodiment of building unit 10 that is arranged in four different positions V1, V2, H1, H2. In positions V1 and V2, the building units 10 are rotated 180-degrees from each other. In positions H1 and H2, the building units 10 are rotated 180-degrees from each other. The two different positions H1 and H2 refer to the two positions of the mating sides 18B and 18D that lay on the axis CLH of the building unit 10 (see FIG. 1). Referring to one of the building units 10 that is in position H1, the mating sides 18B and 18D are oriented 180-degrees as compared to the sides 18B and 18D on the building units 10 that are in position H2. When the building units 10 are in positions H1, H2, the building units are rotated 90-degrees from the positions V1 and V2.

Figure 4:
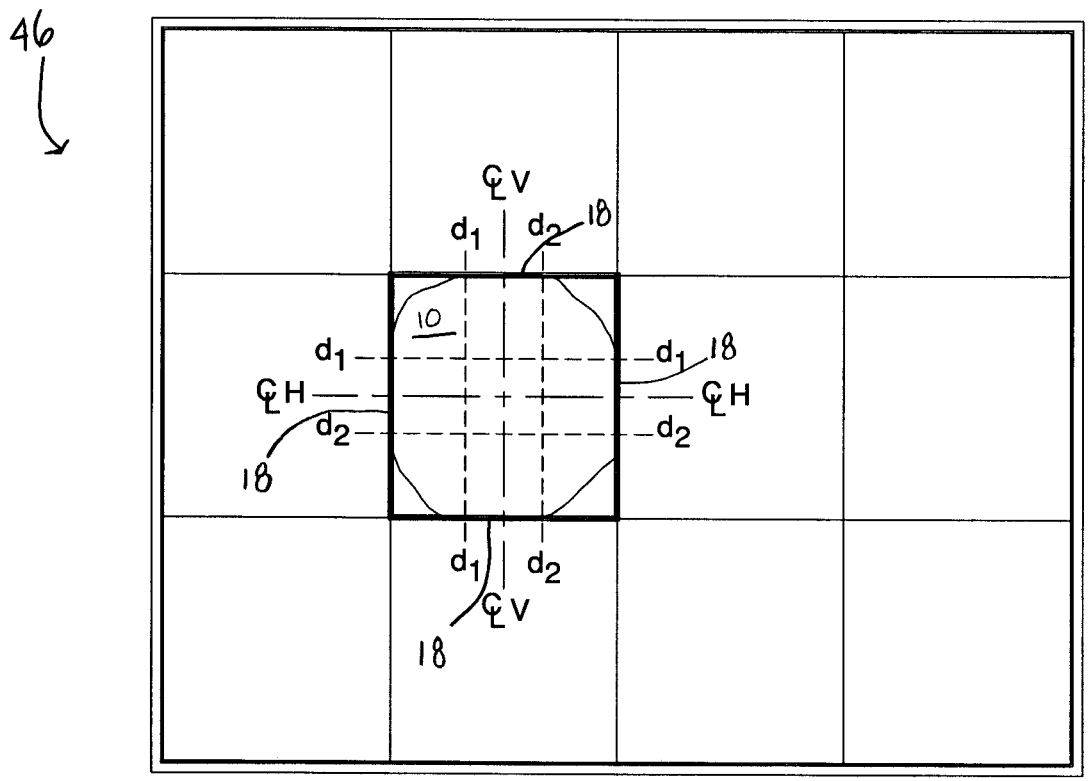
FIG. 4 is a plan view of the building unit within a pallet.

Referring now to FIG. 4, the building units 10 are stored and shipped on pallets 46. The rectangles within the pallet 46 represent the area in which the building units 10 are placed, and do not represent physical boundaries on the pallet. When the mating sides 18 of a first building unit 10 have at least two points that mate with at least two points of a mating side on an adjacent building unit in the pallet 46, the units will not turn or rotate within the pallet. This facilitates cubing of the pallets 46 and prevents building units 10 from becoming loose or falling out of the pallet when the cubes are clamped to squeeze the layers of pallets together. The interlocking of the building units 10 on the pallet 46 reduces breakage of building units.

The preferred building unit 10 has a height of about 1.5-inches, a length of about 13 to 14-inches, and a width of about 11 to 12-inches, however other dimensions are possible. The preferred building unit 10 has a weight in the range of about 10 to 30 pounds, with a preferred weight of about 14-pounds, and has a volume in the range of about 120 to 360 cubic-inches, with a preferred volume of about 165 cubic-inches, however other weights and volumes are possible. In the preferred pallet of FIG. 4, there are twelve building units per layer, 10 layers in a pallet, for a total of 120 building units per pallet, however other arrangements are possible.

The building units 10 may be molded or otherwise made of concrete, stone, ceramics, plastic, natural or synthetic rubber, glass or other suitable material, or combinations thereof. The building units 10 have what appear to be irregular configurations, and the resulting surface covering or structure has the appearance of a natural, custom surface.

An optional aspect of the invention is to vary the appearance of each individual building unit 10 to further enhance the natural, custom appearance of the surface covering 40, 44. Variations include edge, surface and color variations.

Further, the outer contour surface 16 can also be irregularly-shaped in the plane extending from the front surface 12 to the rear surface 14. For example the outer contour surface 16 can taper or be non-uniform from the front surface 12 to the rear surface 14, and the outer contour surface can also be sculpted adding to its irregular shape. The irregular shape can be accomplished with molds, such as static or flexible molds, or by a dry cast method where the cast material is packed in and pushed out. The dry cast molds can be flexible or inflexible, and the dry cast can be straight or alternately can be sculpted with draft. The irregularity can also be created by tumbling and chipping the surface, as is known in the art.

In accordance with the present invention, a wide variety of building units 10 can be designed by those skilled in art. The present invention, defined in the appended claims, is not limited to the particular embodiments disclosed. These embodiments are illustrative, not limiting. Further it should be understood that the irregular mating sides 18 and corners 20 that are shown in the drawings are merely illustrative of the concept. The actual mating sides 18 and corners 20 are a matter of design choice and all configurations are within the scope of the appended claims.

To further enhance the natural appearance of the surface covering 40, 44 it is also possible that the mating sides 18 of adjacent building units 10 match less than perfectly, i.e., that a non-substantial gap is formed between building units 10, and that the non-substantial gap can vary in thickness. This is preferably accomplished by introducing minor variations in the mating sides 18 of the building units 10 so that the mating sides are not identical. Variations, however, cannot be so great as to cause problems in mating adjacent building units 10 or in stacking units in the pallet.

To further improve the natural appearance of surface coverings 40, 44 it is desirable to provide variations in individual building units 10. Dyes and colorants may be added to the building units 10, and the color and quantity of dye may be regulated to produce color variations from building unit to building unit. Surface variations from building unit 10 to building unit are also desirable. One method of introducing surface variation is to tumble the building units 10 after curing. Tumbled building units 10 and methods for tumbling are well known in the art. An alternative method is to hammer the surface and/or edges, of the building unit 10 to create small nicks or marks. Surface or edge variations also may be made in the molds. For example, in a six form assembly, each mold can include a different surface irregularity or variation. Thereby, only every sixth building unit 10 would be the same.

The building units 10 of the invention may be made in any conventional manner, for example by molding. Two preferred molding methods are dry cast and wet cast. Dry cast material can be used to mass manufacture low cost units. Wet cast is more expensive, but produces very high quality units. A preferred dry cast method is slip-form molding from dry mix concrete to form units suited for use in walkways, driveways and patios.

In the wet cast process, a form is constructed with side walls conforming to the planar configuration of the unit (as discussed above) with a bottom of the form designed to mold what will be the outer contour surface 16 or top surface 12 of the building unit 10. The building unit 10 is molded upside down by pouring a concrete mixture into the form and allowing it to cure. An advantage of the wet process is that natural stone materials and other desirable additives may be introduced that are not compatible with mass production by the dry cast process.

Another form of building units 10 of the invention comprises molding stamps, each stamp being comprised of one or more building units. Molding stamps are known to persons skilled in the art. Generally, a surface is formed by pouring, spreading and leveling concrete. While the surface is wet (uncured) molding stamps are pressed into the surface, the surface being molded to conform to the stamp. In forming a stamp molded surface at least one stamp is required, but preferably several stamps are used, including stamps of different sizes and/or shapes resulting from different combinations of building units 10. The stamp molds are aligned and mated one to another in the same manner as described above in reference to pavers. The finished surface has a natural stone appearance, without an apparent repeating pattern, but is actually a concrete slab.

While preferred embodiments of the irregular building units 10 having mating sides 18 have been herein illustrated and described, it is to be appreciated that certain changes, rearrangements and modifications may be made therein without departing from the scope of the invention as defined by the appended claims.

What is claimed is:

1. A surface covering comprising:
  a plurality of building units, each having a plurality of nonlinear mating sides and a plurality of non-mating corners disposed alternatively on an outer contour surface, each non-mating corner being generally rounded, wherein mating of the plurality of building units forms the surface covering, and wherein the surface covering has a plurality of openings, each surrounded by the non-mating corners; and
  at least a first mating side of each of the building units intersects with a major axis, and at least a second mating side of each of the building units intersects with a minor axis, wherein the major axis and the minor axis are generally perpendicular and meet at substantially the center of the building units and the units have a dimension along the major axis that is longer than the dimension of the unit along the minor axis, wherein each of the mating sides is a centered rotation about the respective axis that the mating side intersects with, each of the mating sides having substantially the same length and configuration such that all of the mating sides of one unit are capable of mating any mating side of another unit.

2. The surface covering of claim 1, wherein the surface covering openings are filled with permeable material forming a permeable surface covering that allows drainage through the openings.

3. The surface covering of claim 1, wherein the units are placed in an alternating pattern wherein the major axis of a plurality of units is substantially perpendicular to the major axis of units adjacent thereto.

4. The surface covering of claim 1, wherein the units are placed in a pattern wherein the major axis of a plurality of units is substantially parallel to the major axis of respective units adjacent thereto.

5. The surface covering of claim 1, wherein at least one corner of each unit has a different configuration from a rest of the corners of that unit, wherein the shape of some of the plurality of openings is different than others.

6. The surface covering of claim 1, wherein the outer contour surface is irregular and sculpted.

7. The surface covering of claim 1, wherein non-substantial gaps are defined between the mating sides of adjacent units in the surface covering, and the gaps have variable width.

8. The surface covering of claim 1, wherein the outer contour of each unit is irregularly shaped and surface covering has a natural appearance.

9. A surface covering comprising a plurality of building units, each of the building units having a generally rounded shape, and having a plurality of nonlinear mating sides, each of the plurality of mating sides extending between endpoints, the plurality of mating sides being arranged at a predetermined distance on an outer contour surface, the outer contour surface being irregularly shaped and comprising a plurality of generally rounded, irregularly shaped corners that do not mate with adjacent building units, wherein each of the plurality of corners extends between an endpoint of a first mating side and an endpoint of a second mating side, wherein each of the mating sides has substantially the same length and configuration such that all of the mating sides of one unit are capable of mating any mating side of another unit, and wherein the surface covering has a natural appearance;
  wherein each of the plurality of corners is disposed on the outer contour surface between the first mating side and the second mating side; the first mating side of the building units intersects with a major axis, and the second mating side of each of the building units intersects with a minor axis, wherein the major axis and the minor axis are generally perpendicular and the units have a dimension along the major axis that is longer than the dimension of the unit along the minor axis;

wherein each of the mating sides is a centered rotation about the respective axis that the mating side intersects with.

10. The surface covering of claim 9, wherein in a plurality of units at least one of the corners in the units has a different configuration from the other corners.

11. The surface covering of claim 9 wherein openings in the surface covering are defined between the corners of adjacent building units, and the openings are filled with permeable material forming a permeable surface covering that allows drainage through the openings.

12. A surface covering comprising a plurality of building units, each of the building units having a generally quadrilateral shape, and having a plurality of nonlinear mating sides and a plurality of non-mating corners disposed alternatively on an outer contour surface, each non-mating corner being generally rounded and irregularly shaped, wherein mating of the plurality of building units forms the surface covering, and wherein the surface covering has a plurality of openings, each surrounded by the non-mating corners, the units having at least a first pair of mating sides that intersect with a major axis, and a second pair of mating sides that intersect with a minor axis, wherein the major axis and the minor axis are generally perpendicular and meet at substantially the center of the building unit and the units having a dimension along the major axis that is longer than the dimension of the unit along the minor axis, and wherein each of the mating sides is a centered rotation about the respective axis that the mating side intersects with, each of the mating sides has substantially the same length and configuration such that all of the mating sides of one unit are capable of mating any mating side of another unit, wherein the plurality of building units have a plurality of different rotational positions relative to each other in the surface covering, and wherein the surface covering has a natural appearance.

13. The surface covering of claim 12, wherein the different rotational positions comprise at least a first position and a second position wherein the major axis is rotated 90 degrees from the first position.

14. The surface covering of claim 13, wherein the units in the surface covering are arranged alternately between first and second positions.

15. The surface covering of claim 12, wherein the different rotational positions comprise at least a first position and a second position wherein the major axis is rotated 180 degrees from the first position.

16. The surface covering of claim 12, wherein the different rotational positions comprise a first position, a second position wherein the major axis is rotated 90 degrees from the first position, a third position wherein the major axis is rotated 180 degrees from the first position, and a fourth position wherein the major axis is rotated 270 degrees from the first position.

17. The surface covering of claim 12, wherein for each unit the mating sides in each pair of sides are parallel to each other and the mating sides in the second pair are perpendicular to the mating sides in the first pair.

18. The surface covering of claim 12, wherein in each said building unit the plurality of corners are irregularly shaped and at least one of the corners has a different configuration from the other corners such that each said unit has an overall generally rounded, irregular shape.

19. The surface covering of claim 12, wherein the openings are filled with permeable material forming a permeable surface covering that allows drainage through the openings.

* * * * *